(12) United States Patent
Hultkvist

(10) Patent No.: US 11,155,223 B2
(45) Date of Patent: Oct. 26, 2021

(54) LIGHTWEIGHT BUMPER BEAM

(71) Applicant: GESTAMP HARDTECH AB, Luleå (SE)

(72) Inventor: Jakob Hultkvist, Luleå (SE)

(73) Assignee: Gestamp Hardtech AB, Luleå (SE)

( * ) Notice: Subject to any disclaimer, the term of this patent is extended or adjusted under 35 U.S.C. 154(b) by 132 days.

(21) Appl. No.: 16/461,496

(22) PCT Filed: Nov. 2, 2017

(86) PCT No.: PCT/SE2017/051087
§ 371 (c)(1),
(2) Date: May 16, 2019

(87) PCT Pub. No.: WO2018/097781
PCT Pub. Date: May 31, 2018

(65) Prior Publication Data
US 2019/0344737 A1    Nov. 14, 2019

(30) Foreign Application Priority Data

Nov. 22, 2016 (SE) .................................. 1651522-3

(51) Int. Cl.
*B60R 19/18* (2006.01)
*B60R 19/02* (2006.01)
*B60R 19/24* (2006.01)

(52) U.S. Cl.
CPC ............ *B60R 19/18* (2013.01); *B60R 19/023* (2013.01); *B60R 19/24* (2013.01); *B60R 2019/1813* (2013.01)

(58) Field of Classification Search
CPC ....... B60R 19/18; B60R 19/023; B60R 19/24; B60R 2019/1813; B60R 19/34
See application file for complete search history.

(56) References Cited

U.S. PATENT DOCUMENTS 5,876,077 A * 3/1999 Miskech ................. B60R 19/18
                                                      293/132
8,678,423 B1* 3/2014 Hwang .................... B60R 19/34
                                                      280/495

(Continued)

FOREIGN PATENT DOCUMENTS

DE   102004056249 A1 *  5/2006 ............. B60D 1/488
DE   202012104117 U1    11/2012

(Continued)

OTHER PUBLICATIONS

International Search Report and Written Opinion in corresponding International Application No. PCT/SE2017/051087 dated Feb. 1, 2018 (14 pages).

*Primary Examiner* — James A English
*Assistant Examiner* — Kurtis Nielson
(74) *Attorney, Agent, or Firm* — Jeffri A. Kaminski; Venable LLP

(57) ABSTRACT

A lightweight bumper beam includes an elongated U-shaped monoblock cross member provided at respective ends with an attachment portion for attachment to a body in white of a vehicle. Each attachment portion is provided with two elongated reinforcing means extending between an inner top surface of the elongated U-shaped monoblock cross member and a bracket of said attachment portion. The elongated reinforcing means being arranged at a distance relative to each other so as to form a space therebetween, and said distance being smallest at an intermediate portion of said two elongated reinforcing means.

7 Claims, 6 Drawing Sheets

(56) References Cited

U.S. PATENT DOCUMENTS

| | | | |
|---|---|---|---|
| 9,079,553 B2* | 7/2015 | Banasiak | B60R 19/023 |
| 2006/0255603 A1* | 11/2006 | Rebuffet | B62D 25/209 |
| | | | 293/120 |
| 2007/0056819 A1* | 3/2007 | Kano | F16F 7/12 |
| | | | 188/371 |
| 2009/0045638 A1 | 2/2009 | Handing et al. | |
| 2009/0273197 A1* | 11/2009 | Muskos | B60R 19/023 |
| | | | 293/132 |
| 2010/0320781 A1 | 12/2010 | Steiner | |
| 2011/0187135 A1* | 8/2011 | Kano | B60R 19/34 |
| | | | 293/133 |
| 2011/0193357 A1* | 8/2011 | Klimek | B60R 19/34 |
| | | | 293/133 |
| 2011/0193370 A1* | 8/2011 | Klimek | B60R 19/34 |
| | | | 296/187.09 |
| 2011/0193371 A1* | 8/2011 | Klimek | B60R 19/34 |
| | | | 296/187.09 |
| 2011/0309606 A1 | 12/2011 | Klimek | |
| 2012/0139273 A1* | 6/2012 | Jeong | F16F 7/121 |
| | | | 293/132 |
| 2012/0223536 A1* | 9/2012 | Muskos | B60R 19/18 |
| | | | 293/132 |
| 2014/0346790 A1* | 11/2014 | Kale | B60R 19/18 |
| | | | 293/133 |
| 2016/0129866 A1* | 5/2016 | Kamiya | B60R 19/34 |
| | | | 293/133 |
| 2017/0305220 A1* | 10/2017 | Virupaksha | B60R 19/03 |

FOREIGN PATENT DOCUMENTS

| | | | | |
|---|---|---|---|---|
| FR | 2998524 A1 * | 5/2014 | | B60R 19/18 |
| JP | 2006335241 A | 12/2006 | | |
| JP | 2009280141 A | 12/2009 | | |
| WO | 2016113477 A1 | 7/2016 | | |
| WO | WO-2017044035 A1 * | 3/2017 | | B60R 19/18 |

* cited by examiner

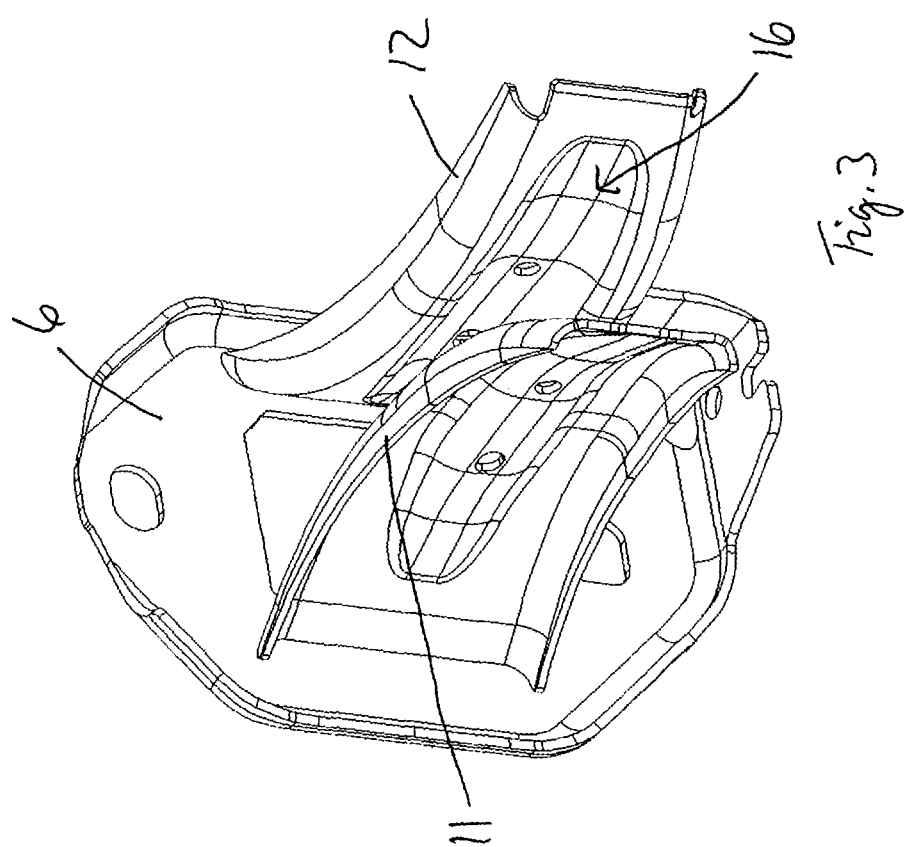

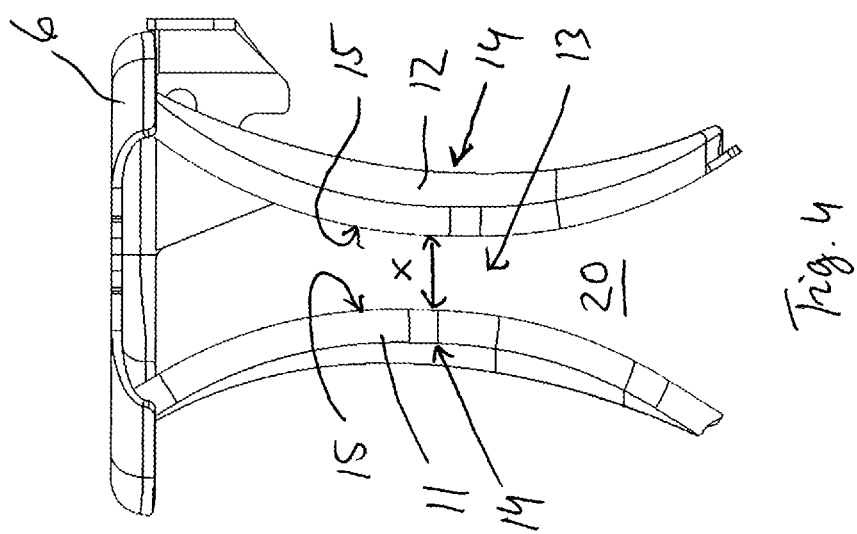

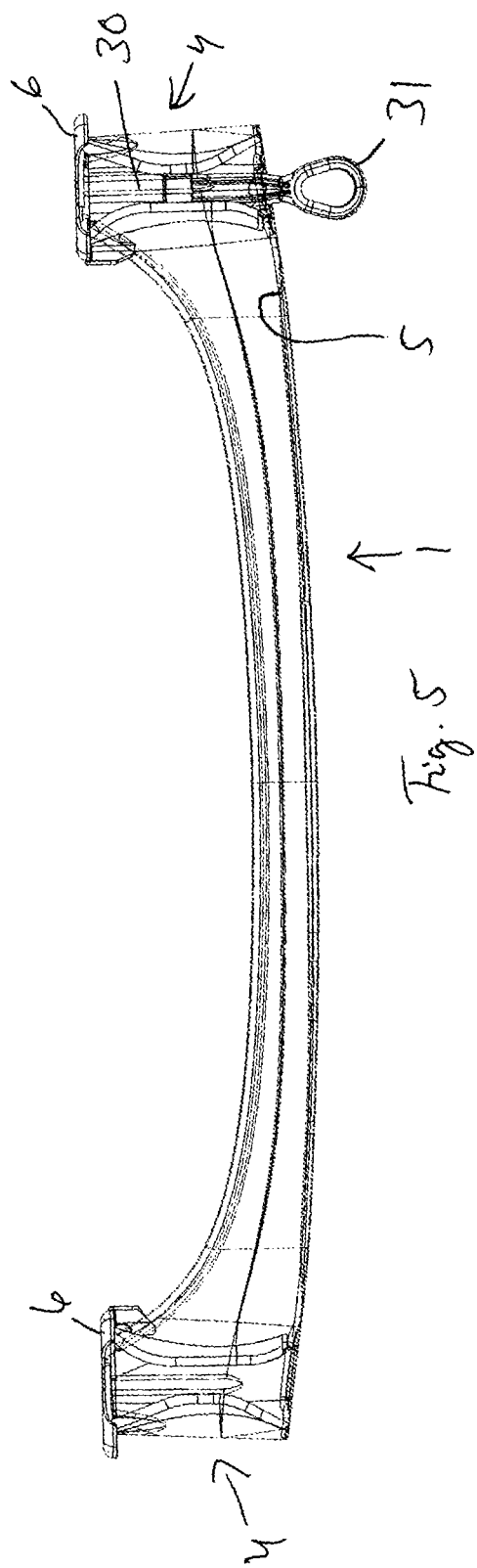

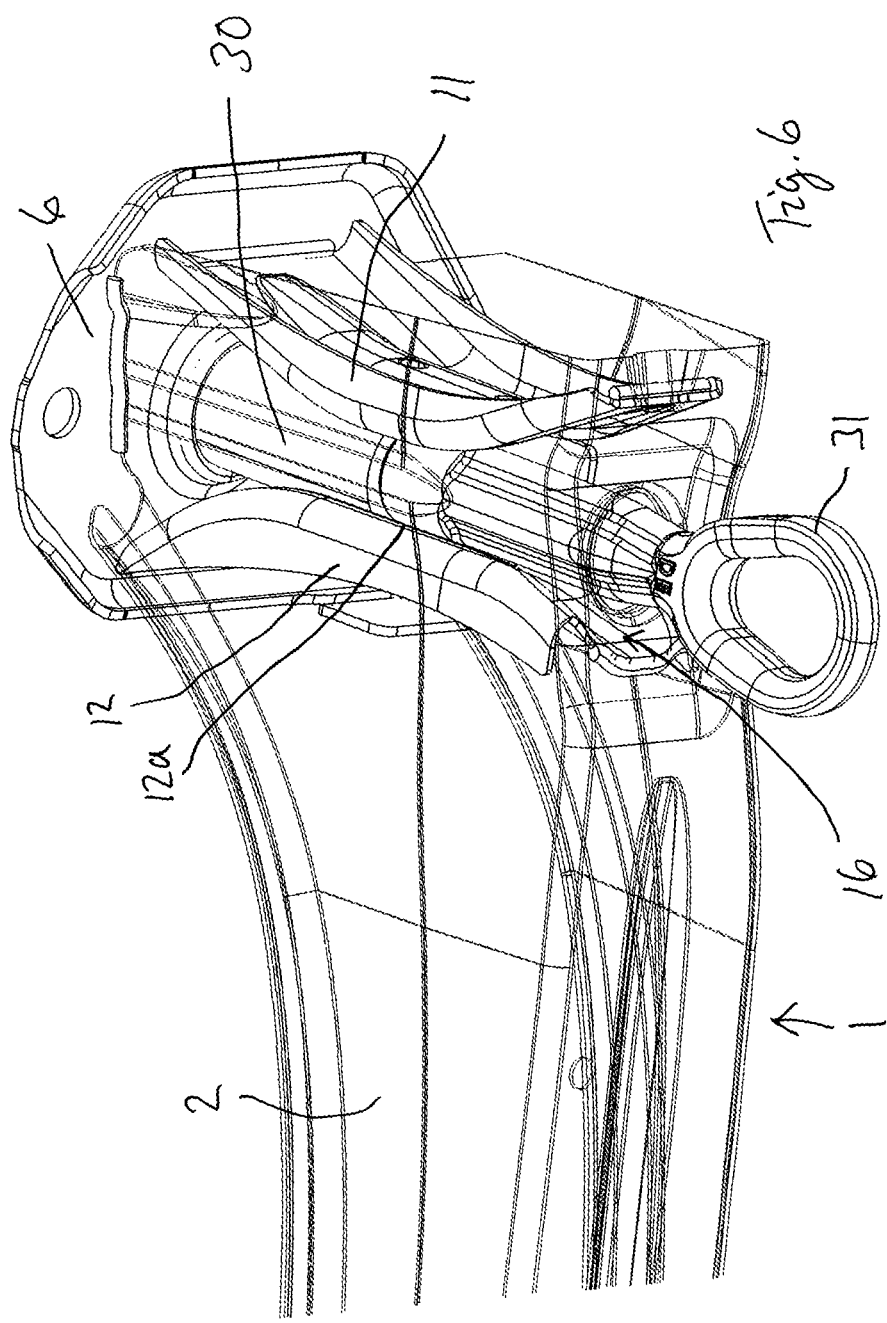

LIGHTWEIGHT BUMPER BEAM

CROSS-REFERENCE TO RELATED APPLICATIONS

This application is a U.S. National Stage application of PCT/SE2017/051087, filed Nov. 2, 2017 and published on May 31, 2018 as WO/2018/097781, which claims the benefit of Swedish Patent Application No. 1651522-3, filed Nov. 22, 2016, all of which are hereby incorporated by reference in their entireties.

FIELD OF THE INVENTION

The invention relates to a lightweight bumper beam according to the preamble of claim 1.

BACKGROUND OF THE INVENTION

For certain markets low speed crash regulations admits the use of much simpler and lighter bumper systems compared to the European and US market. This has typically called for thin, lightweight monoblock bumper systems with relative poor performance if they are to be tested in a high-speed crash test or the RCAR Allianz Crash Repair Test, commonly known as the AZT-crash test.

However, in recent years, manufacturers have asked for performance improvements of bumper beams of the above-mentioned type so as to make them capable of taking higher load and energy levels in high speed crash tests. Future trends also seem to point towards that AZT-crash will be a mandatory requirement in the majority of current markets.

OBJECT OF THE INVENTION

An object of the invention is thus to improve the stability and increase the load and energy levels capable of being taken up by a bumper beam having a typical lightweight monoblock design.

A further object is to strengthen the attachment of a towing tube if the lightweight bumper beam according to the invention is provided with such towing tube.

BRIEF DESCRIPTION OF THE INVENTION

According to the invention these objects are achieved by a lightweight bumper beam, comprising an elongated U-shaped monoblock cross member provided at respective end with an attachment portion for attachment to a body in white of a vehicle, characterized in that each attachment portion is provided with two elongated reinforcing means extending between an inner top surface of the elongated U-shaped monoblock cross member and a bracket of said attachment portion, that said elongated reinforcing means being arranged at a distance relative to each other so as to form a space therebetween, and that said distance being smallest at an intermediate portion of said two elongated reinforcing means.

Preferred embodiments of the lightweight bumper beam are defined in the dependent claims.

BRIEF DESCRIPTION OF THE DRAWINGS

The invention is described in more detail below with reference being made to non-limiting examples shown on the appended drawings, in which FIG. 3 is an enlarged view obliquely from above of a second embodiment of two elongated reinforcing means provided at respective attachment portion of the inventive bumper beam, FIG. 4 is an enlarged view from above of the second embodiment of two elongated reinforcing means shown in FIG. 3, FIG. 5 is a schematic sectional view from above of the inventive bumper beam provided with a towing tube with fitted towing hook at one of the attachment portions, and FIG. 6 is a schematic sectional view from above of an enlarged partial view obliquely from above of the towing tube with fitted towing hook at one of the attachment portions.

DESCRIPTION OF PREFERRED EMBODIMENTS

In the description and claims below the definition of a lightweight monoblock design of a bumper beam is a bumper beam which in its own, without any reinforcing means or crash boxes, and only by occasional attachment plates can be mounted to a vehicle and used as a complete bumper system. Thus, such a bumper system comprises only one energy absorbing part acting as crash boxes and cross member combined.

Figure 1:
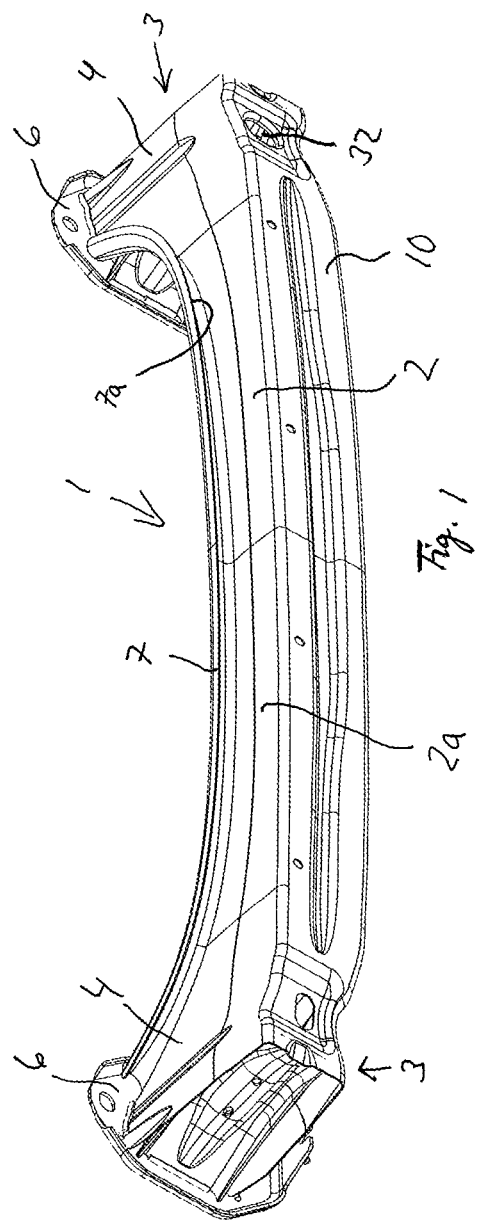
FIG. 1 is a perspective view obliquely from above of an inventive bumper beam with an attachment portion at each end for attachment to a body in white of a vehicle (not shown)

FIG. 1 shows a lightweight bumper beam 1 comprising an elongated generally U-shaped monoblock cross member 2 provided at respective end 3 with an attachment portion 4 for attachment to a body in white of a vehicle (not shown).

As shown in FIGS. 2 to 6, each attachment portion 4 is provided with two elongated reinforcing means 11, 12 extending between an inner top surface 5 (FIG. 5) of the elongated U-shaped monoblock cross member 2 and a bracket 6 of said attachment portion 4. The two elongated reinforcing means 11, 12 are placed essentially in in the longitudinal direction of the vehicle and welded, for instance, at their respective end to the bracket 6 and the inner top surface of the elongated U-shaped monoblock cross member 2, i.e. to the inside surface of the cross member 2.

The two elongated reinforcing means 11, 12 are designed specifically to interact with each other during the buckling sequence of the attachment portion(s) 4 in case of a crash, thus raising the deformation resistance of said attachment portion(s) 4 considerably.

More particular, the two elongated reinforcing means 11, 12 are arranged at a distance X relative to each other so as to form a space 20 therebetween. Said distance X being smallest at an intermediate portion 13 of said two elongated reinforcing means 11, 12. See FIG. 4.

In a preferred embodiment, each of said two elongated reinforcing means 11, 12 is formed of sheet metal and has a general U-shape and each having at least a partially curved inner 14 and outer 15 surfaces. The outer surface 15 of the respective two elongated reinforcing means 11, 12 is directed towards each other which means that said distance X being smallest at the intermediate 13 portion of said curved outer surfaces 15. See FIG. 4

The curvature of the two elongated reinforcing means 11, 12 makes for pronounced initiation of the buckling sequence and early on, the two reinforcing means simply fold towards each other. This helps to keep the initial peak load down. As soon as the outer surfaces 15 of two reinforcing means touch each other, the resistance ramps up and the load level rises significantly.

For best stability the two elongated reinforcing means 11, 12 are mounted standing upwards, orthogonal to an inner upper and lower face of the attachment portion 4 of the elongated U-shaped monoblock cross member 2.

The basic function of the two elongated reinforcing means 11, 12 also works in other shapes, as long as the curvature of the elongated reinforcing means are aimed towards each other and thus interfere during deformation.

Figure 2:
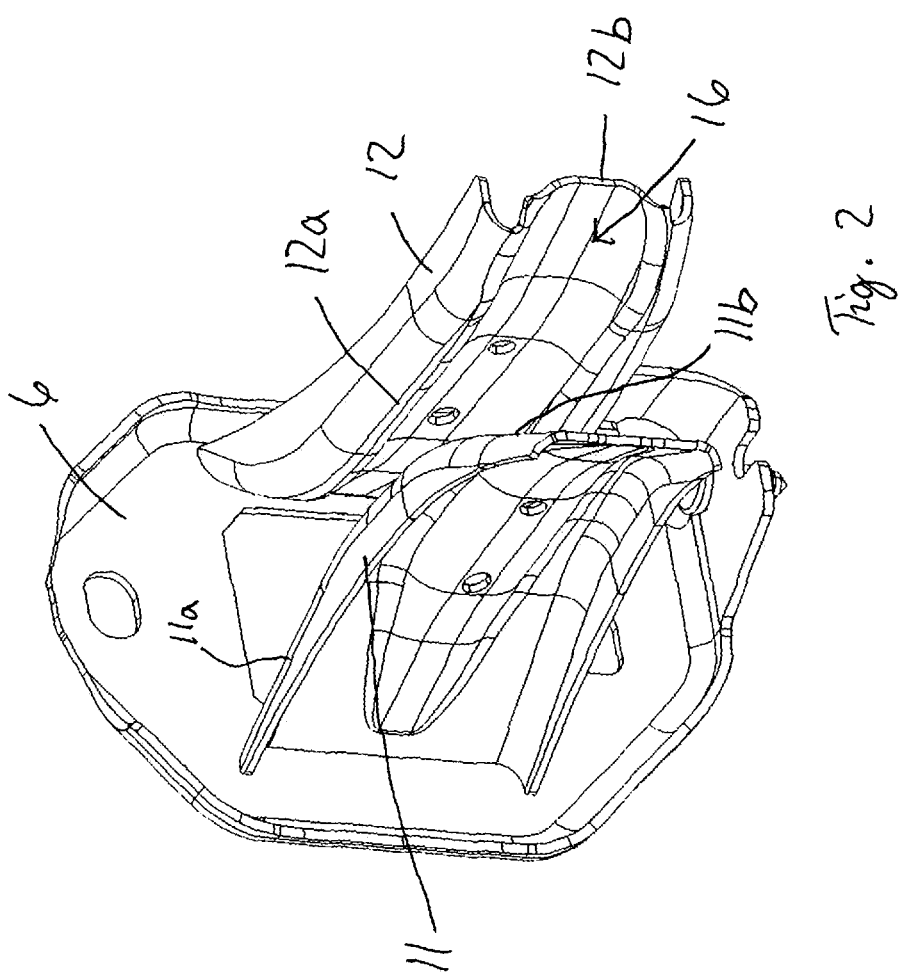
FIG. 2 is an enlarged view obliquely from above of a first embodiment of two elongated reinforcing means provided at respective attachment portion of the inventive bumper beam.

In a preferred embodiment, as shown in FIGS. 2, 5 and 6, in each attachment portion 4 one of the elongated reinforcing means, i.e. the elongated reinforcing means 12, is provided with a straight intermediate portion 12a, and another elongated reinforcing means, i.e. the elongated reinforcing means 11, is provided with straight portions 11a, 11b at the ends attached to the inner top surface 5 of the elongated U-shaped monoblock cross member 2 and the bracket 6 of said attachment portion 4, respectively.

In the embodiment shown in FIGS. 3 and 4, the two elongated reinforcing means 11, 12 have each an evenly progressing curvature.

To increase the resistance to buckling the elongated U-shaped monoblock cross member 2 further comprises, at each end of respective leg 2a of the U, a rim 7 forming part of and extending in the longitudinal direction and over a major portion or the hole length of the elongated U-shaped monoblock cross member 2. Said rim 7 is preferably bent in such a way that an edge 7a thereof is directed parallel with respective leg 2a of the U such as to form a hat-shaped lightweight bumper beam 1.

In FIG. 5, the lightweight bumper beam 1 is provided with a towing tube 30 arranged in at least one of said spaces 20 formed between said outer surface 15 of said respective elongated reinforcing means 11, 12. A towing hook 31 is preferably by means of threads attached to said towing tube 30 when needed. A hole 32 is made in line with the towing tube 30 in a front surface 10 of the elongated U-shaped monoblock cross member 2.

The towing tube 30 has preferably an elongated cylindrical form, and to enable the towing tube 30 to be arranged in said space 20 each of said elongated reinforcing means 11, 12 is provided with a depression 16, preferably having a partial cylindrical form. See FIGS. 2 and 3, for instance. In the embodiment shown in FIG. 3, said depressions 16 may have the same shape and extend preferably at least 60% of the length of each elongated reinforcing means 11, 12, and in the embodiment shown in FIG. 2 the depression 16 of one of the elongated reinforcing means, i.e. the elongated reinforcing means 12, extends to at least one 12b of the ends of the elongated reinforcing means 12 while the depression 16 of the other elongated reinforcing means 11 is shaped as in FIG. 3.

As seen in FIG. 6, at least a portion of the towing tube 30 is arranged to abut on the outer surface 15 of each of said depression 16 formed in respective elongated reinforcing means 11, 12. The towing tube 30 extends at least between said depressions 16 and said bracket 6 of said attachment portion 4.

Thus, as can be inferred from the above-stated the elongated reinforcing means 11, 12 are aimed to increase high speed and AZT-performance of the monoblock bumper beam 1 while maintaining light weight and stability.

Since the elongated reinforcing means 11, 12 are added at the inside of said attachment portion 4 of the monoblock bumper beam 1, it leaves the manufacturer with the possibility of a very light bumper for the low requirement markets, and with the option of adding the elongated reinforcing means 11, 12 for increased stability and load levels on other markets, making an adaptable cross over-bumper beam.

Thus, when the elongated reinforcing means 11, 12 are added at the inside of each attachment portion 4 of the monoblock bumper beam 1, said attachment portions 4 act as reinforced crash boxes.

As can be inferred from the above, lightweight bumper beam 1 according to the invention is of monoblock type having integrated crash boxes.

The invention claimed is:

1. A lightweight bumper beam, comprising an elongated U-shaped monoblock cross member provided at respective ends with an attachment portion for attachment to a body in white of a vehicle, wherein each attachment portion is provided with two elongated reinforcing means extending between an inner top surface of the elongated U-shaped monoblock cross member and a bracket of said attachment portion, said two elongated reinforcing means being arranged at a distance relative to each other so as to form a space therebetween, said distance being smallest at an intermediate portion of said two elongated reinforcing means, wherein each of said elongated reinforcing means is provided with a depression, wherein said two elongated reinforcing means have each at least a partially curved inner and outer surface, the curved outer surface of the respective two elongated reinforcing means being directed towards each other and said distance being smallest at the intermediate portion of said curved outer surfaces, wherein a towing tube is arranged in at least one of said spaces formed between said curved outer surface of said respective elongated reinforcing means, and wherein at least a portion of said towing tube is arranged to abut on each of said depression of respective elongated reinforcing means.

2. The lightweight bumper beam according to claim 1, characterized in that each of said two elongated reinforcing means is made of sheet metal and has a general U-shape and is mounted standing upwards, orthogonal to an inner upper and lower face of the attachment portion of the elongated U-shaped monoblock cross member and stretches in a longitudinal direction of the vehicle.

3. The lightweight bumper beam according to claim 1, characterized in that said elongated U-shaped monoblock cross member further comprises, at each end of respective legs of the elongated U-shaped monoblock cross member a rim forming part of and extending in a longitudinal direction and over a major portion or a whole length of the elongated U-shaped monoblock cross member.

4. The lightweight bumper beam according to claim 3, characterized in that said rim is bent in such a way that an edge thereof is directed parallel with respective legs of the elongated U-shaped monoblock cross member such as to form a hat-shaped lightweight bumper beam.

5. The lightweight bumper beam according to claim 1, characterized in that said towing tube extends at least between said depression and said bracket of said attachment portion.

6. The lightweight bumper beam according to claim 1, characterized in that each of the attachment portions form a crash box attached to the body in white of the vehicle.

7. The lightweight bumper bean according to claim 1, characterized in that said depression extends over at least 60% of a length of each elongated reinforcing means.

\* \* \* \* \*